United States Patent Office 2,734,984
Patented Feb. 14, 1956

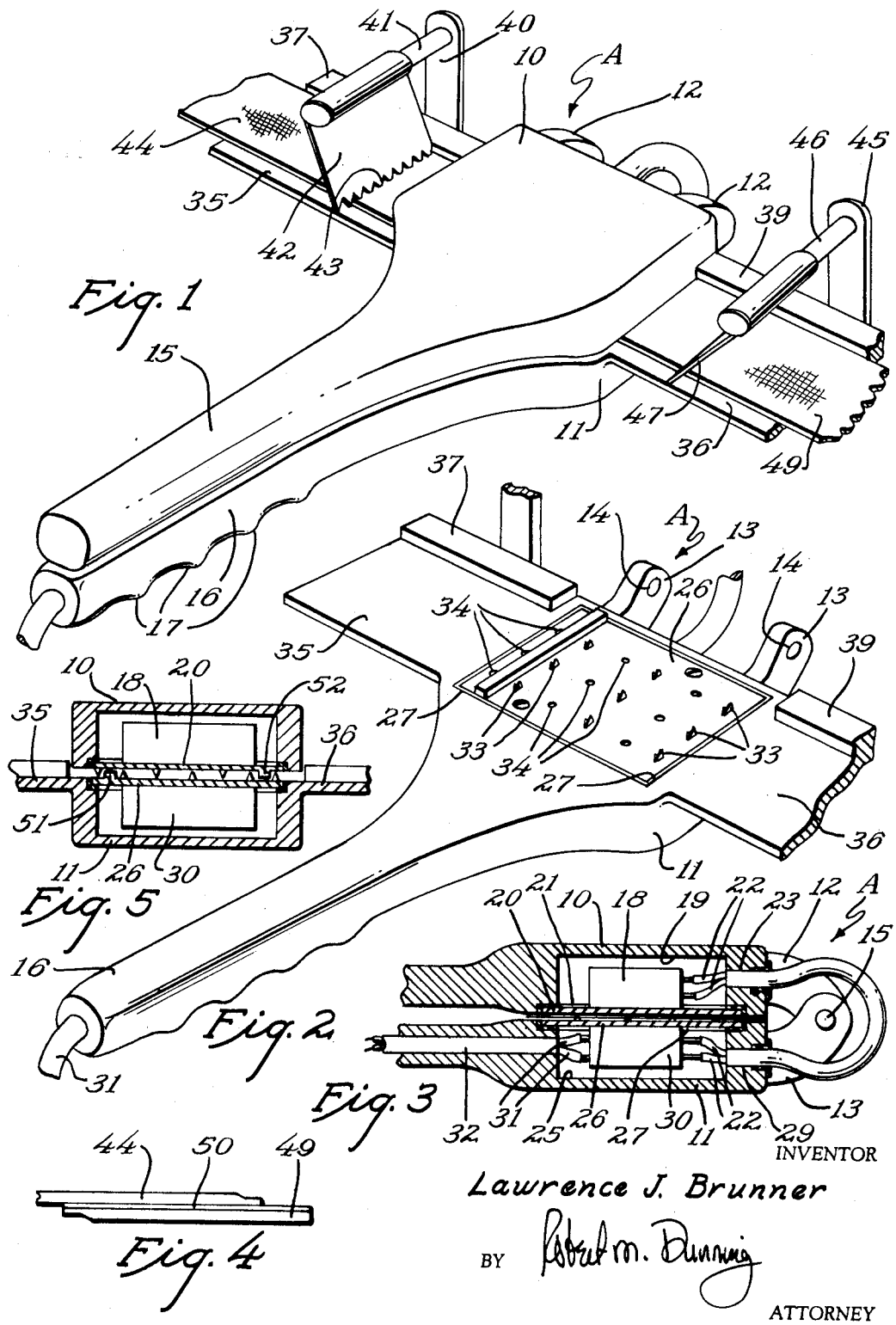

2,734,984

APPARATUS FOR JOINING TAPE

Lawrence J. Brunner, St. Paul, Minn.

Application August 21, 1950, Serial No. 180,611

3 Claims. (Cl. 219—21)

This invention relates to an improvement in apparatus for joining tapes and deals particularly with a means of connecting the ends of two fabric tapes or webs.

Tapes or webs of fabric are usually used in guiding paper or paper board through machines of various types. These tapes are usually in the form of endless belts which form light weight conveyors on which the paper may ride. These tapes are usually secured together by sewing the ends of the tape in overlapping relation. The tapes must usually be sewed together while removed from the apparatus. Often considerable time is required to remove a tape and replace it with a new tape sewed together in endless form. Considerable time could usually be saved if the ends of the tape could be anchored together while the tape was in place. The object of the present invention lies in the provision of a simple and effective device for connecting the ends of a tape or connecting two pieces of tape together. This apparatus includes a means for clamping the ends to be connected and for applying heat thereto. A suitable plastic or similar adhesive is placed between the ends of the tape. This plastic or adhesive is softened by heat. By applying heat to the clamped ends of the tape, the tape ends are adhered firmly together in an extremely short period of time.

A feature of the present invention lies in the provision of a simple clamping device for clamping together the overlapped ends of a tape or tapes and in applying heat thereto. The heat applied is sufficient to soften the adhesive designed to connect the tapes, but is insufficient to scorch the tapes during the connection thereof.

A feature of the present invention lies in the provision of a clamping device including a pair of hinged clamping members provided with handles by means of which they can be clamped together. The clamping members preferably each include heating elements for heating tape and the adhesive used in joining the tape ends.

A further feature of the present invention lies in the provision of guides connected to the clamping members by means of which the tape ends may be aligned. These guides project laterally from one of the clamping members and include shoulder or guide means which act to align the tape ends being connected.

An added feature of the present invention lies in the provision of a clamping means for holding the ends of the tape under tension. When the tape belts are in place they must be tight enough to act as conveyor belts by engagement with rotating pulleys or the like. The present device incorporates means for holding the tape under tension during the application of heat to the overlapped tape ends.

An added feature of the present invention lies in providing clamping means which engage the tape on opposite sides of the clamping and heating element. As a result the extremities of the tape which are arranged in overlapping relation are not under tension during the attaching operation so that there is no tendency for the adhesive to be destroyed by tension thereagainst before the adhesive has set.

These and other objects and novel features of the present invention will be more clearly and fully set forth in the following specification and claims.

In the drawings forming a part of the specification:

Figure 1 is a perspective view of the tape joining apparatus in operation.

Figure 2 is a perspective view of the bottom portion of the clamping device showing the arrangement of parts thereupon.

Figure 3 is a cross-sectional view through the heating and clamping device showing the internal arrangement of parts.

Figure 4 is a side elevation view of the tape ends showing the sheet of plastic therebetween which acts as an adhesive for connecting the tape ends.

Figure 5 is a cross-sectional view.

The tape joining apparatus is indicated in general by the letter A. This apparatus includes an upper clamping member 10 and a lower clamping member 11. The upper clamping member is provided with a pair of spaced curved arms 12 extending from one end thereof. The bottom clamping member 11 is provided with a corresponding pair of projecting ears 13 extending outwardly and upwardly therefrom. The ears 12 and 13 are apertured as indicated at 14. Suitable pivots 15 extend through the apertures 14 to connect the ears 12 and 13 and thereby to hingedly connect the clamping members 10 and 11. A single pivot may extend through all of the arms 12 and 13 or separate pivots may be provided for connecting the arms of each pair.

The top clamping member 10 is provided with a handle element 15 extending therefrom from the side thereof opposite that supporting the ears 12. The lower clamping member 11 is provided with a projecting handle 16 designed to extend in parallel relation to the handle 15. The undersurface of the handle 16 may be provided with spaced knobs or projections 17 to fit between the fingers of the hand.

As indicated in Figure 3 of the drawings the undersurface of the upper clamping member 10 is recessed as indicated at 19. This recess is closed by a clamping plate 20 held in place by screws or other suitable means. Preferably a gasket 21 extends between the plate 20 and the body of the clamping member so as to modify the rate of flow of heat from the clamping plate 20 to the body of the clamping member. A heating element 18 is mounted upon the clamping plate 20 to supply heat thereto. The heating element 22 may be in any desired shape or form and receives the current supply wires 22 which extend through an aperture 23 in the end of the clamping member between the hinge ears 12.

The lower clamping member 11 is provided with a recess 25 therein in the upper surface thereof. This recess is normally closed by a clamping plate 26 secured in place by screws 27 or other suitable means. A gasket 27 is preferably provided between the clamping plate 26 and the body of the clamping member so as to limit the transfer of heat thereto. An aperture 29 is provided in the end of the clamping member between the hinge ears 13. This aperture 29 is designed to accommodate the wires 22 leading to the heating element 18. The wires 22 lead to the heating element 30 which is secured to the undersurface of the clamping plate 26. Current supply wires 31 are also connected to the heating element 30 and extend through an axial passage 32 in the handle 16.

The heating element 18 and heating element 30 may be connected either in series or in parallel between the supply wires 32. As illustrated in Figure 2 of the drawings, the clamping plates 20 and 26 are provided with alternate projections 33 and recesses 34. The projections 33 are designed to extend into one or both of the tapes to be combined and to hold the tape from slipping in any direction. The upper clamping plate 20 is similarly arranged and the projections 33 of one plate correspond in position to the recesses 34 in the other plate. Thus the tapes are held in proper location when the clamping members are hinged together and the projections serve the double purpose of holding the tapes in place and of transmitting heat intimately to the tapes.

As indicated in Figures 1 and 2 of the drawings, the body of the lower clamping member 11 is provided with a pair of laterally extending wings or flanges 35 and 36. A shoulder 37 extends along one edge of the flange 35 at right angles to the axis of the handle 16. An aligned shoulder 39 is provided on the flange 36. When the tapes are inserted into the apparatus they are placed against the respective shoulders 36 and 37 and are thus held in proper alignment thereby.

An upright arm 40 is mounted upon the flange 35 adjacent the shoulder 37. This arm 40 supports a transversely extending pivot arm 41 which is in parallel spaced relation to the flange 35. A locking wing 42 is pivotally supported upon the arm 41. This wing 40 is provided with a toothed edge 43 designed to engage against one tape end 44. The wing 42 is somewhat longer than the distance between the arm 41 and the flange 35 so that an outward pull upon the tape end 44 causes the wing to bind against the flange 35 and to hold the tape end 44 from being pulled outwardly. A similar upright 45 is secured to the flange 36 adjacent to the shoulder 39. This arm 45 supports a pivot arm 46 upon which is supported a wing 47 similar in construction to the wing 42. This wing 47 includes a toothed lower end and is somewhat longer than the distance between the arm 46 and the flange 36. Thus while the tape end 49 is being pulled inwardly into the clamping apparatus, the tape end 49 will ride freely beneath the wing 47. However, an outward pull upon the tape will cause the wing 47 to hinge down against the flange 36 and to lock the tape end 49 from outward movement.

In connecting the ends 44 and 49 the clamping member is hinged into open position with the clamping member 10 hinged away from the clamping member 11. One tape end such as 49 is drawn across the lower clamping plate 26 and the locking wing 47 is swung downwardly thereagainst to hold the tape properly aligned with the shoulder 39 and locked from retraction across the clamping plate. The other tape end 44 is next drawn across the clamping plate, this tape being drawn along the flange 35 against the shoulder 37. When the tape is stretched to the proper degree of tension the wing 42 is swung against the tape and the tape is locked from outward movement. A sheet of thermoplastic adhesive material is next placed between the tape ends 44 and 49. The clamping members 10 and 11 are then hinged together under pressure and held for a few seconds until the heat has penetrated through the tapes and softened the adhesive 50, causing it to become impregnated into the two tapes. The upper clamping member 10 may then be hinged away from the combined tapes and the atmosphere will cool the tapes sufficiently to cause the adhesive to set. Immediately thereafter the wings 42 and 47 may be swung upwardly out of contact with the tape and the tape is joined and ready for use.

In order to provide an extra strong bond at the strip extremities, a transverse rib 51 may be provided on the clamping plate 26 near one edge thereof. A similar transverse rib 52 is provided on the clamping plate 20 near the opposite edge thereof. When the clamping plates are swung together they press the tapes exceptionally hard at these points, causing a particularly strong bond at the extreme ends of the tape as indicated in Figure 4.

In accordance with the patent statutes, the principles of construction and operation of the apparatus for joining tapes have been described and while it has been endeavored to set forth the best embodiments thereof, it is desired to have it understood that obvious changes may be made within the scope of the following claims without departing from the spirit of the invention.

I claim:

1. An apparatus for joining the overlapped ends of tapes, the apparatus including a pair of clamping members, means hingedly connecting the clamping members together, an electrical heating element for heating each of said clamping members, a flange extending laterally to each side of one of said clamping members, and tape gripping means on said flanges for holding the overlapped tapes in alignment, comprising wings pivotally supported on each side of said clamping member and engageable against the tape for holding the tape from movement away from the clamping members.

2. A tape joining apparatus including a pair of hingedly connected elongated members provided with handle portions adjacent their distal ends and having opposed recesses adjacent their hinged ends, a closure plate for each recess detachably connected to the respective elongated members, a plurality of pointed gripping prongs on each closure plate, and an electrical heating element contained in each recess spaced from the walls of said recesses and in heat transfer relation with said closure plates.

3. A tape joining apparatus including a pair of hingedly connected elongated members provided with handle portions adjacent their distal ends and having opposed recesses adjacent their hinged ends, a closure plate for each recess detachably connected to the respective elongated members, a plurality of gripping prongs on each closure plate, and an electrical heating element contained in each recess in heat transfer relation with said closure plates, one of said elongated members being equipped with oppositely extending flanges in lateral alignment with said closure plates, and a wing pivotally mounted on each of said flanges, said wings having toothed edges engageable with a pair of tapes having their edges overlapped between said closure plates.

References Cited in the file of this patent

UNITED STATES PATENTS

| | | |
|---|---|---|
| 1,422,826 | Brown | July 18, 1922 |
| 1,882,925 | Rock | Oct. 18, 1932 |
| 1,997,268 | Scharpf | Apr. 9, 1935 |
| 2,385,353 | Frankel | Sept. 25, 1945 |
| 2,401,991 | Walton et al. | July 11, 1946 |
| 2,441,817 | Huff | May 18, 1948 |
| 2,441,940 | Rohdin | May 18, 1948 |
| 2,475,351 | Castay | July 5, 1949 |
| 2,479,375 | Langer | Aug. 16, 1949 |
| 2,480,794 | Waggoner | Aug. 30, 1949 |
| 2,539,611 | Daniel et al. | Jan. 30, 1951 |